US012552107B2

(12) United States Patent
Orth et al.

(10) Patent No.: US 12,552,107 B2
(45) Date of Patent: Feb. 17, 2026

(54) METHOD FOR CORRECTING RAY DISTORTIONS IN TOMOGRAPHIC 3D PRINTING

(71) Applicant: National Research Council of Canada, Ottawa (CA)

(72) Inventors: Antony Orth, Ottawa (CA); Kathleen Sampson, Ottawa (CA); Jonathan Boisvert, Ottawa (CA); Chantal Paquet, Ottawa (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 354 days.

(21) Appl. No.: 18/271,392

(22) PCT Filed: Jan. 7, 2022

(86) PCT No.: PCT/CA2022/050020
§ 371 (c)(1),
(2) Date: Jul. 7, 2023

(87) PCT Pub. No.: WO2022/147625
PCT Pub. Date: Jul. 14, 2022

(65) Prior Publication Data
US 2024/0066804 A1 Feb. 29, 2024

(30) Foreign Application Priority Data
Jan. 8, 2021 (CA) .................... CA 3107181

(51) Int. Cl.
*B29C 64/393* (2017.01)
*B29C 64/135* (2017.01)
(Continued)

(52) U.S. Cl.
CPC .......... *B29C 64/393* (2017.08); *B29C 64/135* (2017.08); *B29C 64/264* (2017.08);
(Continued)

(58) Field of Classification Search
CPC ..................................... B29C 64/393
See application file for complete search history.

(56) References Cited

U.S. PATENT DOCUMENTS

| 11,446,861 B2 | 9/2022 | Loterie et al. |
| 2001/0012101 A1 | 8/2001 | Mulkens |

(Continued)

FOREIGN PATENT DOCUMENTS

| JP | 2018506725 A | * | 3/2018 | ......... G01B 11/2513 |
| KR | 20170139921 A | * | 12/2017 | ............. B33Y 10/00 |
| WO | 2020/254068 A1 | | 12/2020 | |

OTHER PUBLICATIONS

Extended European Search Report issued in counterpart European Patent Application No. 22736484.1, Nov. 8, 2024, 8 pages.

(Continued)

*Primary Examiner* — Suresh Suryawanshi
(74) *Attorney, Agent, or Firm* — Aird & McBurney LP

(57) ABSTRACT

A system for forming an object having a three-dimensional structure, the system comprising: a container for providing a photo-curable material to be polymerized; a rotatable stage for supporting the container; a light source for providing light rays having at least one light pattern to be guided into the container via an optical assembly; a processing unit for determining the light source's degree of non-telecentricity, and determining an optimally pre-distorted set of the at least one light pattern based on at least the photo-curable material's refractive index; correcting at least one distortion of the light rays caused by refraction at the container interface and/or correcting at least one distortion of the light rays caused by non-telecentricity; and whereby the correction of the at least one distortion of the light rays is performed without altering the calibration of the optical assembly.

29 Claims, 8 Drawing Sheets

(51) Int. Cl.
| B29C 64/264 | (2017.01) |
| B33Y 10/00 | (2015.01) |
| B33Y 30/00 | (2015.01) |
| B33Y 50/02 | (2015.01) |
| G06T 11/00 | (2006.01) |
| B29C 64/241 | (2017.01) |
| B29C 64/245 | (2017.01) |
| B29K 105/00 | (2006.01) |

(52) U.S. Cl.
CPC ............ *B33Y 10/00* (2014.12); *B33Y 30/00* (2014.12); *B33Y 50/02* (2014.12); *G06T 11/008* (2013.01); *B29C 64/241* (2017.08); *B29C 64/245* (2017.08); *B29K 2105/0002* (2013.01)

(56) References Cited

U.S. PATENT DOCUMENTS

| 2002/0008869 | A1 | 1/2002 | Van der Laan et al. |
| 2005/0243295 | A1 | 11/2005 | De Jager et al. |
| 2010/0007896 | A1* | 1/2010 | Fishbaine .......... G01N 21/8806 356/603 |
| 2016/0033879 | A1 | 2/2016 | Raghunathan et al. |
| 2020/0101673 | A1 | 4/2020 | Kelly et al. |
| 2020/0384682 | A1 | 12/2020 | Loterie et al. |
| 2021/0379829 | A1* | 12/2021 | Delrot ................. B29C 64/268 |
| 2022/0274326 | A1* | 9/2022 | Delrot ................. B29C 64/314 |
| 2022/0324174 | A1 | 10/2022 | Loterie et al. |
| 2022/0347929 | A1* | 11/2022 | Delrot ................. B33Y 10/00 |

OTHER PUBLICATIONS

Regehly, M., et al. "Xolography for linear volumetric 3D printing." Nature 588.7839 (2020): 620-624.
International Search Report issued in International Application No. PCT/CA2022/050020, Feb. 10, 2022, 3 pages.
Written Opinion of the International Searching Authority issued in International Application No. PCT/CA2022/050020, Feb. 10, 2022, 6 pages.
Kelly, B. E., et al. "Volumetric additive manufacturing via tomographic reconstruction." Science 363.6431 (2019): 1075-1079.
Loterie, D., et al. "High-resolution tomographic volumetric additive manufacturing. " Nature Communications 11.1 (2020): 852.
Bernal, P. N., et al. "Volumetric bioprinting of complex living-tissue constructs within seconds." Advanced Materials 31.42 (2019): 1904209.
Cook, C. C., et al. "Highly tunable thiol-ene photoresins for volumetric additive manufacturing." Advanced Materials 32.47 (2020): 2003376.
Tumbleston, J. R., et al. "Continuous liquid interface production of 3D objects." Science 347.6228 (2015): 1349-1352.
De Beer, M. P., et al. "Rapid, continuous additive manufacturing by volumetric polymerization inhibition patterning." Science Advances 5.1 (2019): eaau8723.
Shusteff, M., et al. "One-step volumetric additive manufacturing of complex polymer structures." Science Advances 3.12 (2017): eaao5496.
Cui, H., et al. "Three-dimensional printing of piezoelectric materials with designed anisotropy and directional response." Nature Materials 18.3 (2019): 234-241.
Deore, B., et al. "Direct printing of functional 3D objects using polymerization-induced phase separation." Nature Communications 12.1 (2021): 55.
Walker, D. A., et al. "Rapid, large-volume thermally controlled 3D printing using a mobile liquid interface." Science 366.6463 (2019): 360-364.
Schwartz, J. J., and Boydston., A. J. "Multimaterial actinic spatial control 3D and 4D printing." Nature Communications 10.1 (2019): 791.
Moore, D. G., et al. "Three-dimensional printing of multicomponent glasses using phase-separating resins." Nature Materials 19.2 (2020): 212-217.
Hensleigh, R., et al. "Charge-programmed three-dimensional printing for multi-material electronic devices." Nature Electronics 3.4 (2020): 216-224.
Loterie, D., et al. "Volumetric 3D printing of elastomers by tomographic back-projection." Preprint at https://doi.org/10.13140/RG 2.20027.46889 (2018).
Born, M., and Wolf, E. Principles of optics: electromagnetic theory of propagation, interference and diffraction of light. Elsevier, 2013.
Dawson-Haggerty, M. "Trimesh," https://github.com/mikedh/trimesh.
Weigert, M. "gputools: OpenCL accelerated volume processing," https://github.com/maweigert/gputools.
Nickolls, J., et al. "Scalable parallel programming with cuda: Is cuda the parallel programming model that application developers have been waiting for?. " Queue 6.2 (2008): 40-53.
Bagheri, A., and Jin, J. "Photopolymerization in 3D printing." ACS Applied Polymer Materials 1.4 (2019): 593-611.
Horn, B. K. P. "Fan-beam reconstruction methods." Proceedings of the IEEE 67.12 (1979): 1616-1623.
Noo, F., et al. "Image reconstruction from fan-beam projections on less than a short scan." Physics in Medicine & Biology 47.14 (2002): 2525.
Orth, A., et al. "Correcting ray distortion in tomographic additive manufacturing." Optics Express 29.7 (2021): 11037-11054.

\* cited by examiner

25

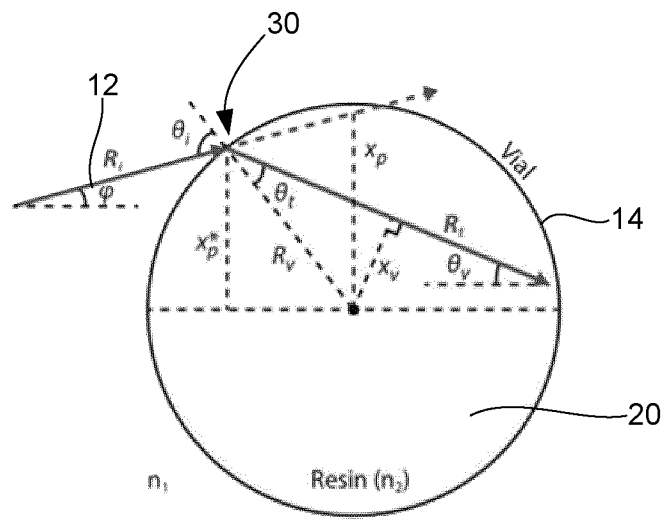
Figure 2a
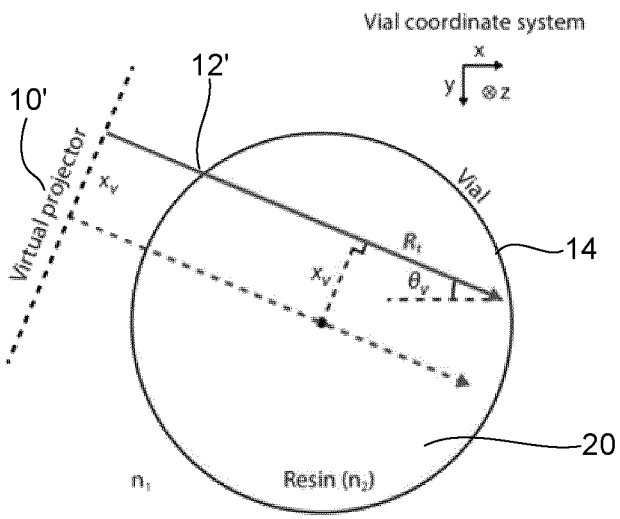
Figure 2b
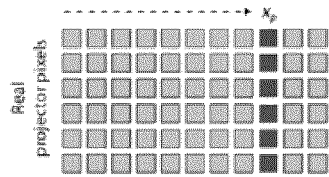
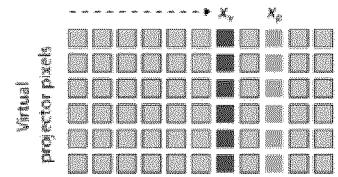
Figure 2cFigure 2d

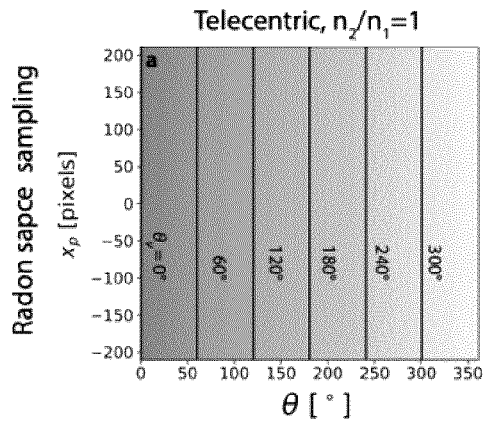
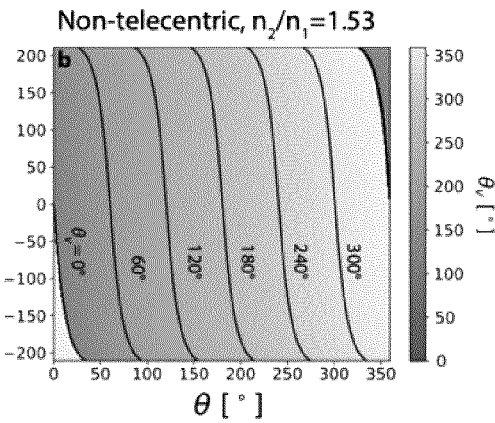
Figure 3a   Figure 3b
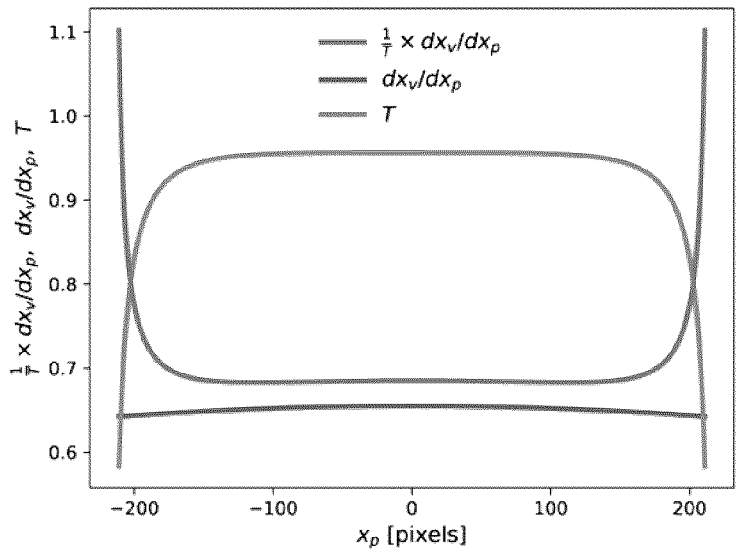
Figure 4
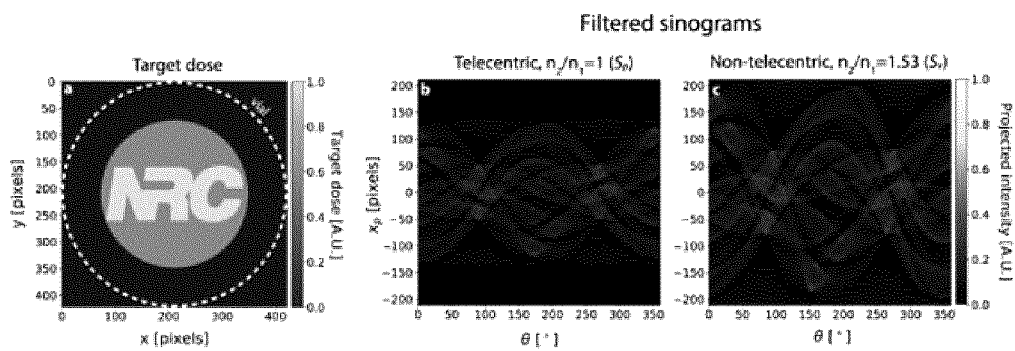
Figure 5a   Figure 5b   Figure 5c

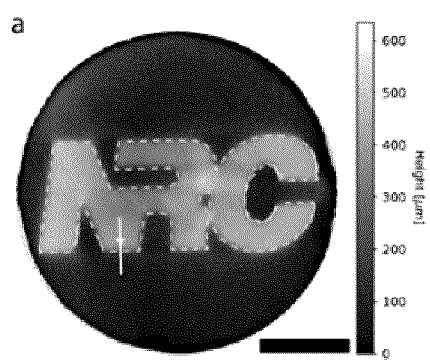 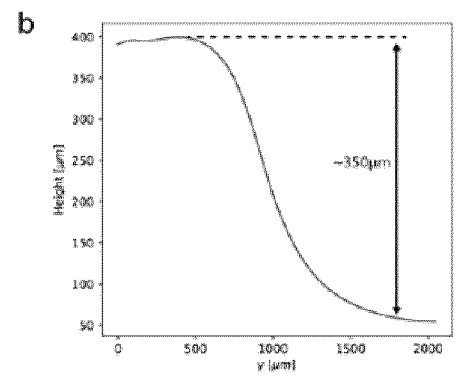
Figure 8a                                 Figure 8b
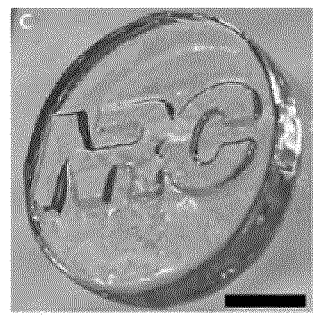 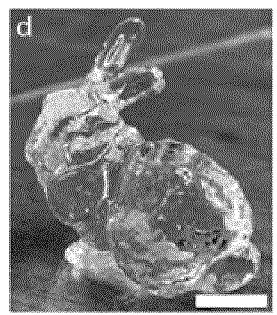 
Figure 8c              Figure 8d              Figure 8e
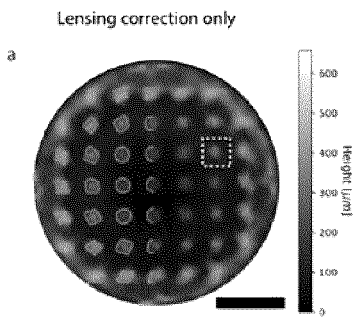 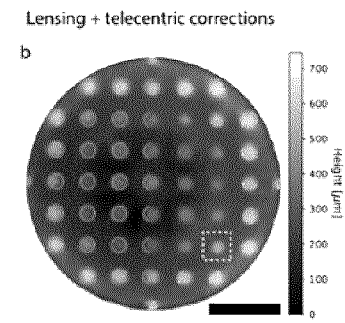
Figure 9a              Figure 9b
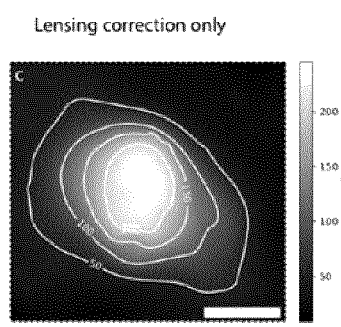 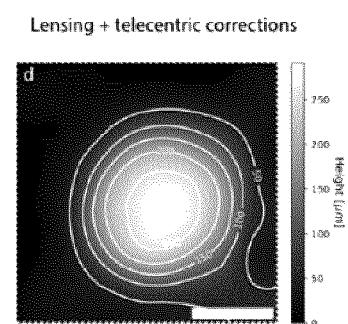
Figure 9c              Figure 9d

METHOD FOR CORRECTING RAY DISTORTIONS IN TOMOGRAPHIC 3D PRINTING

FIELD

Aspects of the disclosure relate to methods and systems for additive manufacturing, more specifically they relate to tomographic additive manufacturing.

BACKGROUND

The design of unique chemistries and innovative printing approaches for photocurable additive manufacturing have led to developments in material design, functionality, and print speed [1-10]. These recent advances in light-based additive manufacturing have advanced the field beyond the traditional serial layer-by-layer fabrication approach. Tomographic additive manufacturing is one of these new techniques which recasts additive manufacturing as a tomographic projection problem [11-13]. In this approach, 2D light patterns are projected through a cylindrical vial containing a photopolymerizable resin, as shown in FIG. 1a. The projections are updated as the vial is made to rotate around its axis using a rotation stage; and the projections are chosen so that the total accumulated dose profile will define the desired object. When a voxel of resin absorbs a threshold light dose, the resin polymerizes into a solid. After a sufficient integer number of rotations, the absorbed light dose induces polymerization within a 3D region that corresponds to the desired object geometry.

One of the advantages of tomographic printing is the elimination of mechanical overhead of the layer-based system, which results in increased print speed and reduced hardware complexity. Although the mechanics of tomographic printing are simplified, the optical considerations are more complex than layer-based systems, where light is projected onto a planar air/resin interface. In tomographic additive manufacturing systems, the resin is contained in a cylindrical glass vial. Consequently, projected light patterns must travel through the curved vial surface to reach the resin. If the vial is in air, this curved refractive index interface acts as a strong, non-paraxial lens that severely distorts the projected light pattern.

In previous implementations of tomographic additive manufacturing, the light patterns in the resin are assumed to be comprised of parallel light rays. In this case, the patterns required to create a given target dose distribution are given by its (filtered) Radon transform. Though this approach is attractive from the perspective of computational simplicity, it requires the use of an index-matching bath [11,12] [FIG. 1a] or a cylindrical lens around the vial to counteract the lensing effect of the vial and resin. With an index matching bath, the sample is suspended from above which complicates sample loading and removal. The index matching fluid is also messy and difficult to clean, and risks damaging the printer's optoelectronic components. Alternatively, a diverging cylindrical lens can be used to counteract the lensing effect of the vial, allowing the vial to be set directly on a rotation stage without index matching fluid. However, the parameters of the cylindrical lens are specific to the size and refractive index of the vial and resin, making this approach less flexible and prone to mismatch.

Another more subtle deviation from the assumed parallel beam geometry comes from the non-telecentricity of a typical projection system. In a non-telecentric system, the chief ray angle (CRA) is generally not parallel to the optical axis [15]. This results in a distance-dependent projection magnification and violates the assumption that all rays are parallel to the optical axis in tomographic additive manufacturing. Unlike the solutions to the lensing distortion above, this distortion cannot be corrected for in hardware without outfitting the projector with telecentric projection optics, which is an expensive modification. Moreover, the need for telecentric projection optics severely restricts the achievable print size because the projector's telecentric field of view must be smaller than the physical lens size.

The role of telecentricity in tomographic additive manufacturing has not been discussed to-date, though a possibly telecentric projection system for tomographic additive manufacturing has been described in the literature [12]. In this previous work, a Fourier-plane aperture is used in the projection path to eliminate the diffracted orders from the digital micromirror device (DMD) projector chip, likely rendering it image-telecentric in the process. Although the authors did not state their intention to render the system telecentric, telecentric optics or computational correction for non-telecentricity is crucial to obtaining high fidelity dose projection.

Light-based additive manufacturing techniques enable a rapid transition from object design to production. In these approaches, a 3D object is typically built by successive polymerization of 2D layers in a photocurable resin. A recently demonstrated technique, however, uses tomographic dose patterning to establish a 3D light dose distribution within a cylindrical glass vial of photoresin. Lensing distortion from the cylindrical vial is currently mitigated by either an index matching bath around the print volume or a cylindrical lens. In another approach, computational correction is attempted for lensing distortion correction, however, the authors do not elaborate their implementation or investigate print fidelity [16].

SUMMARY

In one of its aspects, there is provided a method for additive manufacturing of an object having a three-dimensional structure, the method is implemented by a computing device comprising a processor and a computer readable medium having instructions executable by the processor, the method comprising at least the steps of:
  (a) positioning a vial containing the photo-curable material in a path of light rays from a projector;
  (b) obtaining a first set of correction parameters for correcting the non-telecentricity of the projector;
  (c) obtaining a second set of correction parameters for correcting for the refractive index of the photo-curable material;
  (d) calculating projection patterns associated with a 3D geometry of the object based on at least the first set of correction parameters and the second set of correction parameters; and
  (e) projecting, via an optical assembly, the projection patterns onto the vial containing the photo-curable material to form the object.

In another of its aspects, there is provided a method for correcting for non-telecentricity of a light source used in an additive manufacturing system to form an object having a three-dimensional structure formed from a photo-curable material in a container, wherein the photo-curable material receives a light dose comprising light rays, the method comprising:

(a) calculating a parallel-beam sinogram S on a regular $(x_v, \theta_v)$ grid, where $x_v$ denotes the location of a virtual projector column, and $\theta_v$ is a rotation angle of the virtual projector;

(b) determining the location of distorted rays on the parallel-beam sinogram grid;

(c) determining a relationship between the ray trajectories in the container $(x_v, \theta_v)$, and the spatial $(x_p)$ coordinate on a physical projector and angular ($\theta$) coordinate of the physical projector, where $x_v$ is the spatial coordinate of a ray $R_t$ travelling through the photo-curable material at angle $\theta_v$ with respect to the optical axis on a virtual projector;

(d) performing Fourier-back projection filtering on a standard Radon sinogram S to obtain a filtered sinogram $S_f$;

(e) resampling the filtered sinogram $S_f$ from the standard Radon space $(x_v, \theta_v)$ to the modified physical projector space $(x_p, \theta)$ to obtain a resampled sinogram $S_r$;

(f) projecting a projection geometry for a plurality of the 2D slices of the 3D object onto a container with a photo-curable material, wherein the 3D object is formed by simultaneously projecting the plurality of the 2D slices along a first direction.

In another of its aspects, there is provided a system for forming an object having a three-dimensional structure, the system comprising:

a container for providing a photo-curable material to be polymerized;

a rotatable stage for supporting the container;

a light source for providing light rays having at least one light pattern to be guided into the container via an optical assembly;

a processing unit for determining the light source's degree of non-telecentricity, and determining an optimally pre-distorted set of the at least one light pattern based on at least the photo-curable material's refractive index; correcting at least one distortion of the light rays caused by refraction at the container interface and/or correcting at least one distortion of the light rays caused by non-telecentricity; and whereby the correction of the at least one distortion of the light rays is performed without altering the calibration of the optical assembly.

Advantageously, one aspect of the disclosure teaches a computational method for correcting for the distortions caused by refraction at the vial and non-telecentricity, which eliminates the requirement for an index matching fluid bath for a 3D printer system, thereby making it much more user friendly. Information about the projector's degree of non-telecentricity, also known as the "throw ratio", and the refractive index of the resin is used to calculate an optimally pre-distorted set of projection patterns. When the image is projected into the resin, the refraction at the vial surface and the non-telecentricity of the vial distort the projected patterns, yielding the correct light patterns within the resin. The corrections for non-telecentricity and refraction from the vial may be implemented in separately or in combination.

In addition, one aspect of the disclosure teaches that the lensing effect may be computationally corrected by resampling the parallel-beam radon transform into an aberrated geometry without hardware approaches to distortion correction. This approach for correcting for non-telecentricity inherent in most optical projection systems may culminate in a more simple and flexible class of tomographic 3D printers where deviations from the assumed parallel-beam projection geometry are rectified computationally.

Computational correction for the lensing effect of the vial and non-telecentricity eliminates the need for correction hardware and simplifies sample manipulation. In particular, the correction for non-telecentricity is desirable to obtaining correct print geometry throughout the entire write field, and the optical ramifications of this method and system compared to traditional index-matching.

BRIEF DESCRIPTION OF THE DRAWINGS

Several exemplary embodiments of the present disclosure will now be described, by way of example only, with reference to the appended drawings in which:

FIG. 2a shows a trajectory of a single ray $R_i$ exiting the projector at an angle $\varphi$ with respect to the optical axis; and a ray $R_t$ travelling through the resin at an angle $\theta_v$ with respect to the optical axis due to refraction at the air/vial surface;

FIG. 2b shows the spatial coordinate of ray $R_t$ at a virtual projector oriented at $\theta_v$, $(x_v)$ obtained by tracing ray $R_t$ back to the virtual projector;

FIG. 2c shows the projector columns $x_p$ and $x_v$ corresponding to the rays $R_i$ and $R_t$ on the real projector;

FIG. 2d shows the projector columns $x_p$ and $x_v$ corresponding to the rays $R_i$ and $R_t$ on the virtual projector;

FIG. 3a shows a Radon space sampling for telecentric (parallel beam) projection; and FIG. 3b shows a plot $\theta_v$ using parameters for an experimental setup;

FIG. 4 shows projection weighting factors due to Fresnel transmission, and non-uniform projection resampling;

FIG. 5a shows target 2D dose distribution (i.e. a single slice), in which the x- and y-coordinates denote the spatial coordinates within the vial;

FIG. 5b shows a Fourier-filtered sinogram for the target dose in FIG. 5a, with telecentric projection (i.e. parallel beam) and no lensing (n2/n1=1);

FIG. 5c shows a Fourier-filtered sinogram for the target dose with non-telecentric projection ($T_r$=1.8) and lensing distortion at the air/vial interface (n2/n1=1.53);

FIG. 8a shows a height map of 3D printed embossed NRC logo, in which the dashed outline shows the intended print geometry from FIG. 7(d);

FIG. 8b shows the height along the solid white line in FIG. 8a;

FIG. 8c shows a photograph of the embossed NRC logo;

FIG. 8d shows a photograph of a Stanford bunny model printed using the method of an aspect of this disclosure;

FIG. 8e shows a photograph of the same bunny as in FIG. 8d after painting;

FIG. 9a shows a height map for a grid of posts, without correction for non-telecentricity;

FIG. 9b shows a height map for a grid of posts with correction for non-telecentricity;

FIG. 9c shows high resolution profilometry of the boxed regions in FIG. 9a;

FIG. 9d shows high resolution profilometry of the boxed regions in FIG. 9b;

DETAILED DESCRIPTION OF EXEMPLARY EMBODIMENTS

Figure 1A:
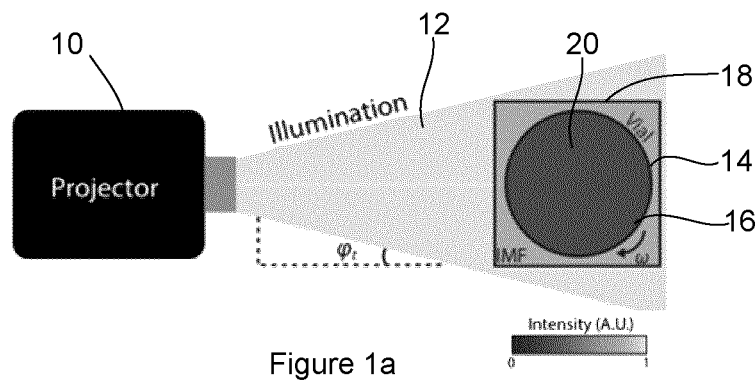
FIG. 1a shows a schematic of a standard index-matched tomographic 3D printing setup, in which a projector projects patterns through a vial which is immersed in an index matching fluid (IMF)

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Moreover, it should be appreciated that the particular implementations shown and described herein are illustrative of the invention and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In tomographic additive manufacturing, a series of 2D light patterns is projected sequentially in time such that the integrated light dose in the cylindrical resin volume approximates the target light dose pattern. The simplest case is realized when light rays forming the projections travel parallel to each other through the resin, the so-called parallel beam geometry. Generally, this geometry is unphysical due to diffraction effects and the finite etendue of the projection system [12]. It is generally assumed that each pixel in the projector projects a non-diverging beam through the resin.

Figure 1B:
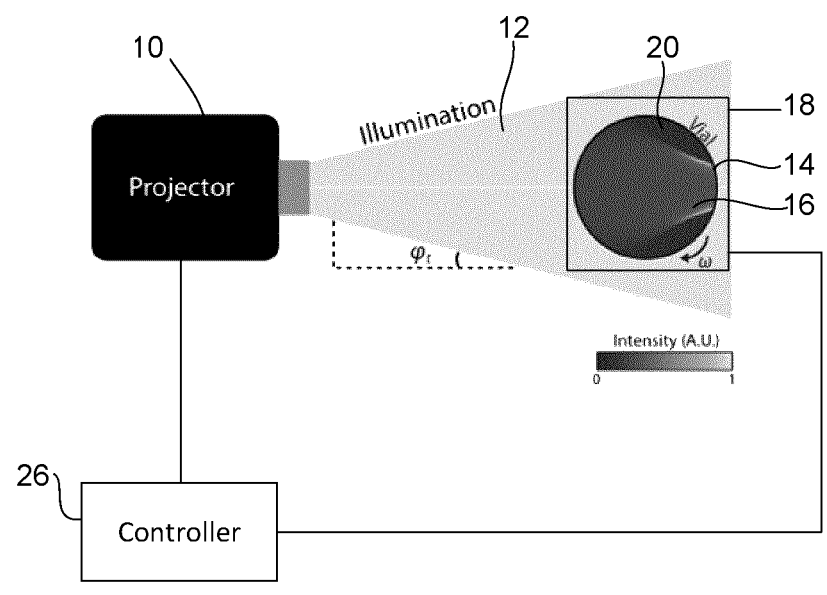
FIG. 1b shows a schematic of a standard index-matched tomographic 3D printing setup, in which a projector projects patterns through the vial in the absence of the index matching fluid.

FIG. 1a shows an overhead schematic of a standard index-matched tomographic 3D printing setup comprising a projector 10 that projects patterns 12 through a vial 14 which is immersed in an index matching fluid (IMF) 16. The vial 14 is placed on a rotation stage 18 that rotates at angular rotation rate ω. The maximum illumination angle is denoted as $\varphi_t$. The assumption of parallel illumination is only valid for telecentric projection, where $\varphi_t$=0.2 D light patterns 12 are projected through the vial 14 containing a photo-curable material 20, such as a photopolymerizable resin. The projections 12 are updated as the vial 14 is made to rotate around its axis using the rotation stage 18. The projections are chosen so that the total accumulated dose profile will define the desired object. When a voxel of resin 20 absorbs a threshold light dose, the resin 20 polymerizes into a solid. After a sufficient integer number of rotations, the absorbed light dose induces polymerization within a 3D region that corresponds to the desired object geometry. Refraction at the vial surface 30 changes the trajectory of illumination rays 12 within the vial 14. As seen in FIGS. 1a and 1b, the colormap inside the vials 14 indicates the relative intensity in the vial 14 from uniform illumination. A color bar indicating the intensity color mapping is shown in the bottom right corner. The intensity maps are calculated by tracing chief rays through the vial 14 as described below.

A target dose distribution may be approximated by projecting its Radon transform through the resin 20. This results in a low contrast applied dose distribution due to the reduced sampling of the Radon transform at higher spatial frequencies, an effect which is well understood via the Fourier slice theorem. A higher fidelity projected dose can be achieved by either Fourier filtering the sinogram [12], or by applying iterative methods to arrive at a more accurate projected dose [11]. When an index matching bath 16 or cylindrical correction lens is employed, and if the projection system 10 is image-space telecentric, then it suffices to project the optimized sinogram without further modification. If either of these assumptions are violated, however, the projected patterns 12 need to be modified to fully correct for the non-ideal ray trajectories.

The corrections for non-telecentricity and refraction at the air-vial interface 30 may be derived by first considering non-telecentricity in isolation followed by a full treatment of both non-telecentricity and air-vial interface refraction together.

Referring to FIGS. 2a-d, we consider the projection geometry for a 2D slice of a 3D object, in which the 3D object is built up by simultaneously projecting many such slices along the vertical direction. FIG. 2a shows a trajectory of a single ray $R_i$ 12 exiting the projector 10 at an angle φ with respect to the optical axis. Refraction at the air/vial surface 30 results in ray $R_t$ 12' travelling through the resin at angle $\theta_t$ with respect to the optical axis. FIG. 2a shows the spatial coordinate of $R_t$ 12' at a virtual projector 10' oriented at $\theta_v$. The column coordinate ($x_v$) is obtained by tracing $R_t$ 12' back to the virtual projector 10'. The vial coordinate system, which is distinct from the projector coordinate system, is shown in the top right corner. FIG. 2c shows the projector columns $x_p$ and $x_v$ corresponding to the rays $R_i$ 12 and $R_t$ 12' on the real projector 10; and (c) and FIG. 2d shows the projector columns $x_p$ and $x_v$ corresponding to the rays $R_i$ 12 and $R_t$ 12' on the virtual projector 10'.

In this example, only non-telecentricity in the horizontal direction (in the xy plane in FIGS. 2a-d) is considered, however, non-telecentricity also affects print geometry in the vertical direction (along the y-axis of the vial 14; the z-direction in FIG. 2).

Generally, most projectors are not image-space telecentric, meaning that the magnification of the projected image increases with distance. This effect is captured by the "throw ratio" which is defined as Tr=D/W where is the distance from the projector 10 to the image plane along the optical axis and W is the width of the full projected image [17]. An equivalent differential definition of the throw ratio is given by $dW/dD=T_r^{-1}$. From simple geometry, the throw ratio sets the chief ray angle (CRA) φ at the edge of the field of view:

$$\varphi|_{x_p=W/2} = \tan^{-1}\left(\frac{1}{2}\frac{dW}{dD}\right) = \tan^{-1}\left(\frac{1}{2T_r}\right) \quad (1)$$

where $x_p$ denotes the projector column position (see FIGS. 2a-d). For notational simplicity, this maximal CRA is shown as $\varphi_r = \varphi|x_p = W/2$ in FIG. 1. Within the field of view, the CRA can be calculated in terms of the projector column position $x_p$ by noting that tan $\varphi(x_p)$ =$x_p$/D. This can be rewritten in terms of the throw ratio as:

$$\varphi(x_p) = \tan^{-1}\left(\frac{x_p}{T_r W}\right) \quad (2)$$

Next, we consider the lensing distortion due to the cylindrical glass vial 14 and the non-telecentricity of the projection system. The geometry of ray $R_i$ 12 incident on the vial 14 is shown in FIG. 2a. The cylindrical vial 14 acts as a cylindrical lens, such that at the at the air-vial interface 30, the ray $R_i$ 12 experiences refraction towards the optical axis. Unlike atypical cylindrical lens, however, light is incident over nearly the entire semicircle of the air/vial interface 30, and causes significant aberrations. The vial 14 with resin 20 does not form a focus, necessitating a nonparaxial treatment to properly model the applied dose distribution in the resin 20.

Exemplary steps for a method for correcting the lensing distortion will now be described. The standard parallel-beam geometry is connected to the lensing-distorted geometry by a resampling of the standard parallel-beam sinogram. As an exemplary first step, the parallel-beam sinogram S is sampled on a regular ($x_v$, $\theta_v$) grid, where $x_v$ denotes the location of a virtual projector column, and $\theta_v$ is the rotation angle of the virtual projector 14. In the more general case when rays 12 are not parallel to the optical axis, the ray trajectories define a resampling of S from the coordinates of a virtual projector 10', with column coordinate $x_v$, to the physical projector with column coordinate $x_p$ at vial rotation angle θ:

$$(x_v, \theta_v) \to (x_p, \theta) \quad (3)$$

Next, the resulting resampled physical projector sinogram is denoted as $S_r$ ($x_p$, θ). Once the location of each of the distorted rays on the parallel-beam sinogram grid is known, the resampling may be performed. The expressions for $x_v$ and $\theta_v$ are defined in terms of the physical projector ($x_p$, θ) coordinate system, in which $x_p$ and $x_v$ refer to locations in the projector coordinate systems, as shown in FIGS. 2c and 2d, which are distinct from the (x, y) vial coordinate system which are used to visualize dose profiles below.

Looking at FIG. 2a, for ray $R_i$ 12 from the projector 10 travelling at an angle φ from the optical axis, ray $R_i$ 12 is incident on the vial 14 at position $x^*_p$, with angle of incidence $\theta_i = \sin^{-1}(x^*_p/\varphi(x_p))$. From Snells's law, the transmitted ray $R_t$ 12' is transmitted at an angle $\theta_t = \sin^{-1}(n_1/n_2 \sin \theta_i)$ with respect to the vial surface normal. When the vial 14 is rotated by θ, then ray $R_i$ 12 corresponds to a projection along the direction defined by:

$$\theta_v = \sin^{-1}\left(\frac{x^*_p}{R_i}\right) - \sin^{-1}\left(\frac{n_1}{n_2}\sin\theta_i\right) + \theta \quad (4)$$

It should be noted that $x^*_p$ is related to the projector pixel coordinates $x_p$ by:

$$x_p = x^*_p + \sqrt{R_i^2 - x^{*2}_p}\tan\varphi = x^*_p + \sqrt{R_v^2 - x^{*2}_p}\frac{x_p}{T_r W} \quad (5)$$

This quadratic equation can be solved for $x^*_p$ in terms of the projector coordinate $x_p$, and the known parameters $T_r$, W, and $R_v$:

$$x^*_p = (x_p - x_p\sqrt{1-\alpha(1-(R_v/T_r W)^2)})/\alpha \quad (6)$$

where $\alpha = 1+(x_p/T_r W)^2$. Accordingly, $\theta_v$ in Eq. (4) may be numerically evaluated over a regular ($x_p$, θ) grid.

Next, the perpendicular distance from the ray $R_t$ 12' to the center of the vial 14 is determined using FIG. 2a together with Snell's law and Eq. (4):

$$x_v = R_v \sin(\theta_v) = x^*_p \cos\theta_v - \sqrt{R_v^2 - x^{*2}_p}\sin\theta_v \quad (7)$$

Accordingly, $x_v$ is the spatial coordinate of the ray $R_t$ 12' on a virtual projector 10' with rotation angle $\theta_v$. Similar to $\theta_v$, $x_v$ is numerically evaluated over a regular ($x_p$, θ) grid. For our system, we find that $$x_v \approx \frac{n1}{n2}x_p,$$

and in the case of telecentric projection ($T_r \to \infty$), this equality becomes exact. The refraction of the vial 14 effectively rescales the spatial dimension of the projections, and therefore the dose profile, by a factor of n1/n2. For the resin 20 and vial 14, n2≈1.53 (see experimental section for details), representing a magnification of the target dose profile by n1/n2≈0.65. Therefore, the maximum diameter of a printed object in the xy plane is $$2\frac{n1}{n2}x_p$$

$$R_v \approx 1.31 R_v.$$

FIG. 3*a* shows $\theta_v$ in the case of telecentric projection without lensing distortion (n2/n1=1). This is the situation described by the standard Radon transform; at each rotation angle θ, a family of parallel beams travel through the vial 14. Here, the projection angle is given by the vial rotation angle and is independent of the projector coordinate. However, when the projection is non-telecentric and/or there is refraction at the vial boundary 30, the projection angle is no longer independent from the projector coordinate.

FIG. 3*b* shows a plot $\theta_v$ using parameters for an experimental setup (Tr=1.8, n2/n1=1.53), which includes non-telecentricity and refractive lensing distortion. In this case, the vertical contour lines of constant $\theta_v$ are distorted into curves. For each vial rotation angle, a range of projection angles are present.

With this relationship between the coordinates of the standard Radon transform $(x_v, \theta_v,)$ and the spatial $(x_p)$ and angular (θ) coordinates of the physical projector, it is possible to now resample a sinogram from standard Radon space $(x_v, \theta_v)$ to the modified space $(x_p, \theta)$. Conveniently, a Fourierback projection filtering on the standard sinogram is performed before resampling to the $(x_p, \theta)$-space, resulting in a fast computation of high contrast distortion-corrected projections. In one example, an interpolate.interpn function in the SciPy Python library, with linear interpolation is used for the resampling step.

When resampling to the $(x_p, \theta)$-space, the change in size of the differential area element in Radon space may be accounted for. Assuming that each single-pixel beam 12 from the projector 10 is perfectly collimated, the angular sampling rate remains equal to angular step size of the vial 14 rotation. However, the sampling rate on the virtual projector 10' varies with the position and angle of incidence of each ray 12 on the vial 14. The relative sampling step size, $dx_v/dx_p$, on the virtual projector 10' is obtained by numerical differentiation of Eq. (6) and shown in FIG. 4. The relative sampling step on the virtual projector 10' decreases slightly for increasing $|x_p|$, leading to an over representation of these rays 12 in the resampled sinogram $S_r(x_p, \theta)$. This effect may be corrected by multiplying $S_r$ by $dx_v/dx_p$: $S_r \rightarrow S_r \times dx_v/dx_p$. Mathematically, this corresponds to multiplication by the determinant of the Jacobian of the change of variables applied to the Radon transform. A further correction is made to the resampled sinogram to account for Fresnel reflections at the air/vial surface. To achieve this, $S_r$ is normalized by the Fresnel transmittance T for each ray 12 emitted from the projector 10. The Fresnel transmittance for the system geometry is shown in FIG. 4, along with the combined weighting factor applied to the sinogram:

$$\frac{1}{T} \times dx_v/dx_p.$$

One effect that cannot be normalized for, however, is the expansion of a beam by the factor $$\frac{\cos \theta t}{\cos \theta i}$$

upon retraction at the air/vial interface 30. This effect is most pronounced at the edge of the vial 14, where the angle of incidence becomes very oblique. This decreases the light dose spatial resolution at the edge of the write area, however, other physical effects such as dose diffusion, beam spreading, and print post-processing (e.g. washing and post-curing) may have a larger overall effect on 3D printing fidelity. The beam expansion upon refraction is accompanied by a reduction in the angular beam spread by $(n_1/n_2) \times (\cos \theta_t/\cos \theta i)$ due to the conservation of etendue. This has the effect of extending the depth of field by a factor of $$\frac{n1}{n2}$$

at the center of the projector 10, and by a larger amount for increasingly oblique rays.

To print a target dose distribution the resampled sinogram needs to be projected into the vial, as shown in FIG. 5*a*, for example. When the raw parallel-beam sinogram is used as an input for resampling, the resulting dose suffers from low contrast due to the intrinsic bias towards low spatial frequencies caused by the Radon transform [11]. To alleviate this effect, a Ram-Lak (or "ramp") Fourier filter in Radon space is applied, as is done in Fourier_back projection (FBP). However, this results in negative projection values, which cannot be supplied by the projector 12, and therefore to eliminate that phenomenon, all negative projection values are set to 0. The resulting non-negative filtered projections for telecentric projection with n2/n1=1 and non-telecentric projection with n2/n1=1.53 are shown in FIGS. 5*b* and 5*c*, respectively. Qualitatively, the lensing distortion applies an approximate shear to the projections, as would be expected from change in ray angle with $x_p$. The projections are also scaled along the $x_p$ axis as a result of the approximate minification of projections in the resin 20.

After obtaining the modified projections, we simulate the applied light dose within the vial by ray tracing the chief rays from each projector pixel through the vial. The projected dose is determined by multiplying the ray dose in the vial, R(x, y; $x_p$, θ), by the intensity of the resampled sinogram at $(x_p, \theta)$, and the sum over all chief rays:

$$D(x,y) = \Sigma_{x_p,\theta} R(x,y;x_p,\theta) S_r(x_p,\theta) \tag{8}$$

Figures 6A, 6B, 6C:
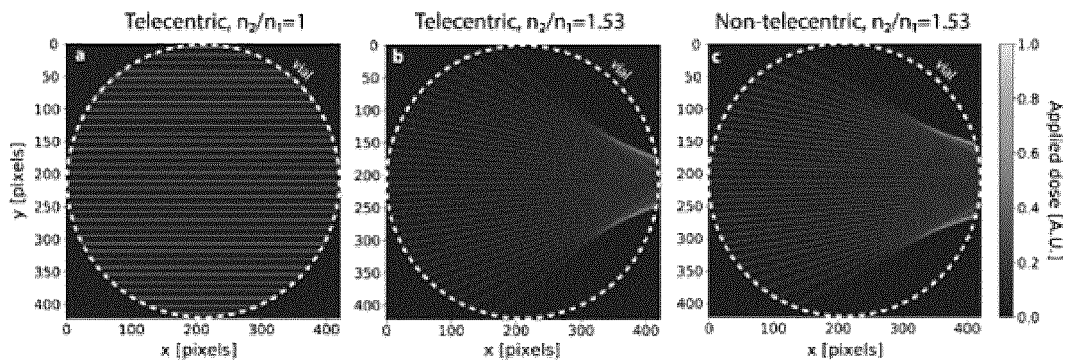
FIG. 6a shows the chief ray trajectories for $\theta$=0 for telecentric projection with index matching.
FIG. 6b shows the chief ray trajectories for $\theta$=0 for telecentric projection without index matching.
FIG. 6c shows the chief ray trajectories for $\theta$=0 for the true non-telecentric geometry without index matching.

Using the following parameters in the system: n2/n1=1.53 and $T_r$=1.8, FIG. 6*a* shows the chief ray trajectories for θ=0 for telecentric projection with index matching, FIG. 6*b* shows the chief ray trajectories for θ=0 for telecentric projection without index matching, while FIG. 6*c* shows the chief ray trajectories for θ=0 for the true non-telecentric geometry without index matching. The beam expansion at the air/vial interface 30, as described previously, is also taken into account. Finally, it is assumed that the refractive index of the vial 14 and the resin 20 are equal, so that there is no refraction at the vial/resin interface 30 and the thickness of the vial 14 wall may be ignored. This is a reasonable assumption because the borosilicate vial 14 and resin are expected to have a refractive index difference on the order of 0.01-0.02, resulting in ray deviations in the resin smaller than the Nyquist resolution of the dose projection.

Figures 7A, 7B, 7C:
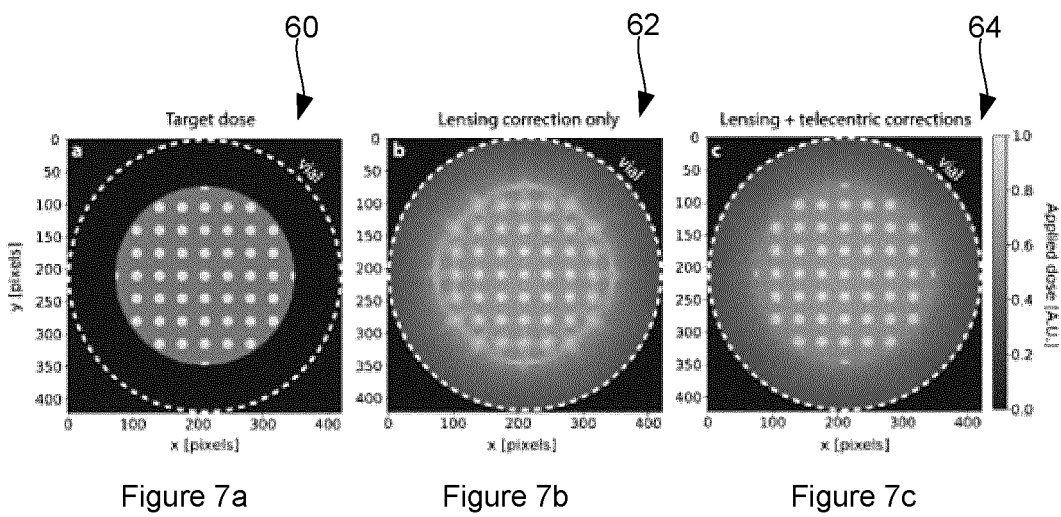
FIG. 7a shows a target disc grid dose.
FIG. 7b shows a simulated applied dose for FIG. 7a with lensing correction and without correction for non-telecentric projection.
FIG. 7c shows a simulated applied dose for FIG. 7a with lensing correction and without correction for non-telecentric projection.
Figures 7D, 7E, 7F:
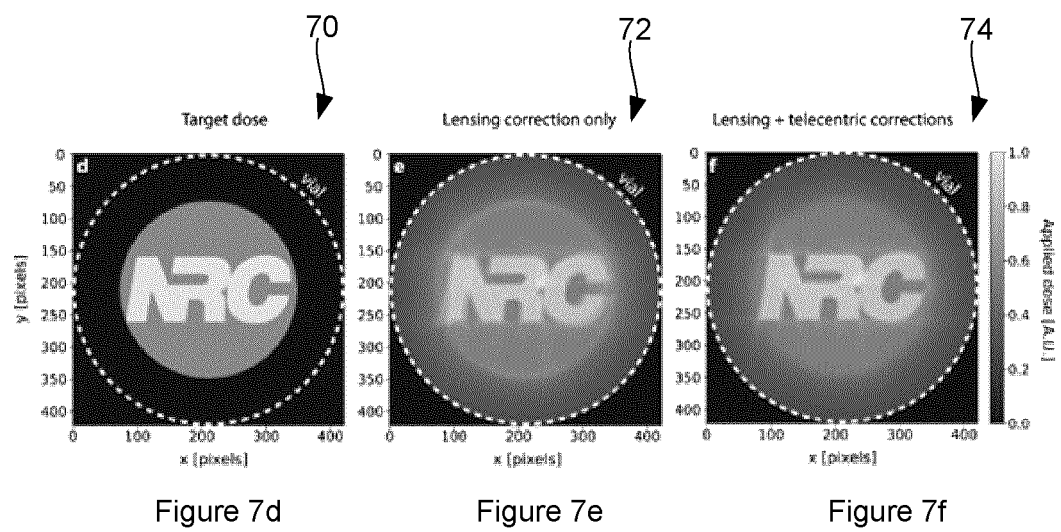
FIG. 7d shows a simulated NRC logo with lensing correction and without correction for non-telecentric projection.
FIG. 7e shows a simulated NRC logo for FIG. 7d with lensing correction and corrected for non-telecentric projection.
FIG. 7f shows a simulated NRC logo for FIG. 7e with lensing correction and without correction for non-telecentric projection.

Calculation of the chief ray trajectories above allow for direct simulation of dose accumulation during a print, enabling visualization of artifacts related to incorrect sinogram resampling. FIG. 7a shows a target dose geometry 60 and FIG. 7b shows a simulated applied dose 62 for target dose geometry 60 with lensing correction and FIG. 7b shows a simulated applied dose 64 for target dose geometry 60 without correction for non-telecentric projection. FIG. 7d shows a target dose geometry 70 and FIG. 7e shows a simulated applied dose 72 for target dose geometry 70 with lensing correction and FIG. 7f shows a simulated applied dose 74 for target dose geometry 70 without correction for non-telecentric projection. If the sinogram is erroneously resampled assuming telecentric projection, significant distortions occur away from the center of the write area, as shown in FIGS. 7b and 7e. These distortions may be corrected for when accounting for non-telecentricity of the projector 10, as shown in FIGS. 7c and 7f, emphasizing the importance of non-telecentricity correction (or telecentric projection optics) in tomographic additive manufacturing. The nature of the non-telecentric artifacts varies with the print geometry and field position and is particularly noticeable when printing periodic features such as the grid pattern in FIGS. 7(a) and 7(c).

Figure 10:
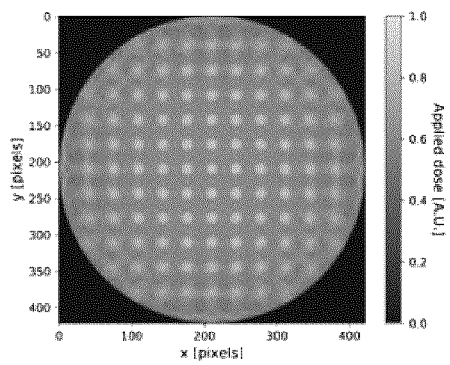
FIG. 10 shows an expected dose profile for the grid geometry in FIG. 7(a), without non-telecentricity correction, but with an index matching bath to eliminate refraction at the vial surface.

These simulation results indicate the importance of non-telecentricity correction to maintain print resolution and accuracy away from the center of the vial 10. In FIG. 10 of Appendix 1, it is shown that this is true even when the vial is immersed in an index-matching fluid bath, which does not eliminate the non-telecentricity of the projector optics. On the other hand, very strong distortions occur when the refractive lensing effect at the surface of the vial is ignored, as shown in FIG. 11 of Appendix 2.

The Experimental Setup

FIG. 1b shows a schematic of an exemplary experimental setup, in which system 25 comprises a projector 10, a borosilicate scintillation vial 14 (n≈1.52, nominal diameter 25.4 mm) filled with resin 20 (n2≈1.53) is placed on a rotation stage 18, such as an M-060.PD precision rotation stage from Physik Instrumente (PI) GmbH & Co. KG. Germany, located approximately 100 mm from the projector lens 11. The projector 10 focus is adjusted so that the projected image is in focus as the center of the rotation stage 18. In this example, projector 10 is a CEL5500 projector from Digital Light Innovations Inc., U.S.A. with a 460 nm light emitting diode light source is used. The maximum intensity at the focal plane was measured to be 3.8 mW/cm2 (grayscale value=255), and the intensity was verified to be linear with grayscale value. The projector 10 has W=1024 pixels in the horizontal direction, and a manufacturers specification of Tr=1.8, resulting in a maximum CRA of φt=15.5° at the edge of the projection field. For the vial-projector lens distance of 100 mm, the pixel pitch at the focal plane is measured to be 65 μm.

The resin 20 was prepared similarly to that reported previously in literature [11]. Two acrylate crosslinkers were used as the precursor materials: bisphenol A glycerolate (1 glycerol/phenol) diacrylate [BPAGDA] and poly(ethylene glycol) diacrylate Mn 250 g/mol [PEGDA250] in a ratio of 3:1. To this BPAGDA/PEGDA250 mixture, the two component photoinitiator system, camphorquinone [CQ] and ethyl 4-dimethylaminobenzoate [EDAB], was added in a 1:1 weight ratio and CQ at a concentration of 7.8 mM in the resin 20. The concentration of the photoinitiators was adjusted to this value such that the penetration depth of the resin 20 was in-line with the radius of the vial 14. The resin 20 was mixed using a planetary mixer at 2000 rpm for 20 min followed by 2200 rpm for 30 sec, then separated into 20 mL scintillation vials (filled to ~15 mL), which were used as the vial for tomographic printing. The resin 20 was kept in a fridge for storage and allowed to warm to room temperature before use. As seen in FIG. 1b, the colormap inside the vials 14 indicates the relative intensity in the vial 14 from uniform illumination. A color bar indicating the intensity color mapping is shown in the bottom right corner.

Figure 13:
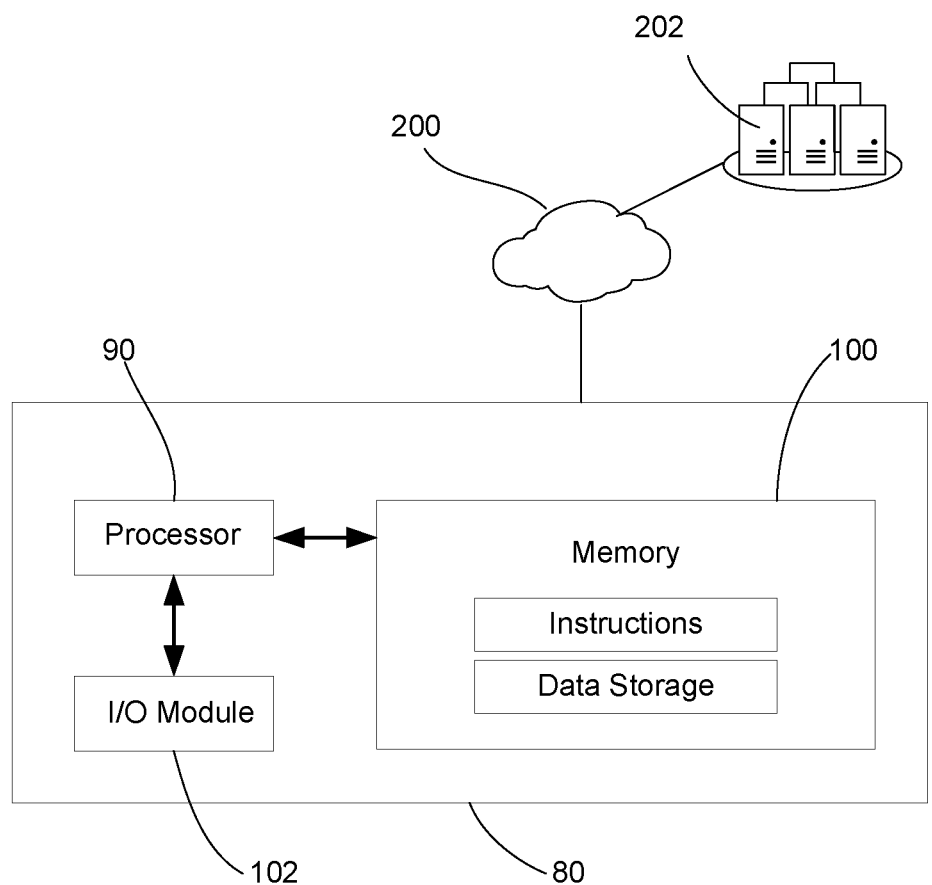
FIG. 13 shows an exemplary computing system.

The system 25 may include a controller 26, such as a computing device, for controlling various aspects of the additive manufacturing. As can be seen in FIG. 13, the computing device 26 may include one or more processors 90, a memory 100 for storing instructions, and an interface 102 for inputting/receiving various parameters and instructions for the computing device 26. In various embodiments, computing device 26 may have a database for storing any suitable information related to the additive manufacturing process. For example, database may store computer-aided design (CAD) files representing the geometry of a 3D object.

The penetration depth of the resin mixture at the projection wavelength was measured to be 15.9 mm, which is slightly less than the diameter of the writable area in the vial (16.6 mm). With this relatively long absorption length, raytracing revealed that there is only a small underexposure (~4%) at the center of the vial if the effect of absorption is neglected. Thus, absorption correction was not performed in order to simplify the projection calculation process. It was observed that the magnitude of this absorption length underexposure is similar in magnitude to the variation caused by the non-negative FBP process itself (e.g. see dose variation within the NRC logo in FIG. 70).

The manufacturer lists refractive indices of nD=1.557 and 1.463 at λ=587.56 nm for BPAGDA and PEGDA250, respectively. We assume that the 3:1 mixture has a weighted average refractive index of the two constituents, resulting in n2=1.53. Although the projector operates at λ=460 nm, the increase in refractive index at this wavelength was minimal.

The Printing Procedure

Prior to projection, the vial position in the projector field is located by scanning a line through the vial. During this calibration scan, a camera, such as the FLIR GS3-U3-32S4M-C camera from Edmund Optics Inc., U.S.A., with c-mount lens e.g. 25 mm/F1.8 #86572 from Edmund Optics Inc., U.S.A.), oriented perpendicular to the projection axis, images the vial 14. When the scan line encounters the edge of the vial, the photoinitiator in the resin absorbs projected light and emits fluorescence. This fluorescence is captured by the camera. The apparent edges of the write volume are located by finding the scan line positions for which there is a large. Due to the non-telecentric projection, the distance between the apparent edges of the write volume slightly underestimates the true diameter of the write volume. The true radius $R_v$ of the write volume is:

$$R_v = R_a \sqrt{1 + (R_a/T_r W)^2} \quad (9)$$

where $2R_a$ is the distance between the two vial edges as measured using the procedure above. $R_a$ is measured and subsequently calculate Rv (both in units of projector pixels) before each new vial print to account for small manufacturing variations. Typically, Ra≈211 projector pixels, which gives a maximum CRA in the resin of $\varphi|_{vial}=\tan^{-1}(R_a/(T_r \times 1024))=6.53°$. This violates the often-assumed parallel ray (telecentric) geometry that requires φ=0.

After completing the calibration procedure, projections are calculated for the desired printobject. For embossed geometries, as shown in FIGS. 8a-8c and FIGS. 9a-d, the 3D models were created directly as NumPy arrays in Python, followed by a Radon transform and ramp filtering for both the disc and embossed layers. For complex geometries, as shown in FIG. 8d, a custom Python script was used to import, slice and rasterize an STL file representing the object [18]. Graphics Processing Unit (GPU) acceleration was implemented to speed up Radon transform calculation and ramp filtering of projections for the entire object [19,20]. The calculated projections are then multiplied by a scalar factor between 1-2 to increase print speed if desired. The python script is run and causes the processor to sends the projections to the projector 10, which displays the projections at 16 frames per second (fps). The rotation stage 18 is set to rotate at ω=10°/s; the beginning of rotation and projection display are software synchronized in the python script. After an integral number of rotations, the projection sequence terminates, and the rotation stage 18 stops. Typical print times were between 2.4-4.8 minutes (4-8 full rotations).

After printing, the vial 14 is removed from the stage 18, and the printed object is removed from the vial 14, and uncured resin is removed by wiping with a delicated task wiper, such as a Kimwipe from Kimberly Clark Corporation, U.S.A. Final curing is achieved by placing the print in a Formlabs curing box for 120 minutes at 75° C. Height maps of the cured objects are acquired using an optical profiler, such as the CT100 optical profiler from Cyber Technologies GmBH, Germany, with an in-plane sampling period of 50 µm and 5 µm for low- and high-resolution heigh maps, respectively.

To verify our computational approach to distortion correction in tomographic additive manufacturing, test geometries corresponding to the target dose profiles in FIGS. 7a-f were printed, on top of 3.6 mm-thick 3D printed discs. The disc and test geometry are printed as a single object with the test geometry embossed on the disc. The purpose of the disc is to supply rigidity to the print, thereby minimizing object distortion due to the compliance of the object after the initial cure. The design thickness of the embossed test geometry is set to 10 projector pixels, corresponding to 650 µm.

The height map of a 3D printed NRC logo, along with a dashed outline of the target dose from FIG. 7d, is shown in FIG. 8a. Excellent agreement between the target and in-plane printed geometries were obtained, as evidenced by the close match of the target outline to the height map. Here, the target dose outline is shrunk by 1.5% to match the scale of the print. The slightly smaller in-plane size of the print can be attributed to the shrinkage inherent in photopolymers [21], and/or a slight error in the assumed refractive index of the resin. The height of the embossed NRC logo is approximately 350 µm, as shown in FIG. 8b, which is less than the design height of 650 µm. This deviation may be due to complex polymerization dynamics at the boundary of the exposed region of the disc [4]. This method is also capable of printing more complex 3D geometries such as the Stanford bunny in FIG. 8d-8e. The printed object has good qualitative fidelity including small scale surface texture features on the back of the bunny. Moreover, the ears are printed correctly which is notable given that they have a high aspect ratio, are unsupported and are located near the edge of the write area of the vial, where distortion correction is most crucial.

To experimentally verify the effect of the correction for non-telecentric projection, the grid geometry from FIG. 7a without correction for non-telecentricity (FIG. 9a) and with correction for non-telecentricity (FIG. 9b) were printed. The design height of the posts is 650 µm. The uncorrected print shows major distortions to the circular posts in the grid away from the center of the print, yielding shapes qualitatively similar to those predicted by the dose simulations in FIG. 7b. High resolution profilometry reveals that the ideally circular post takes on a highly eccentric shape due to the ray trajectory errors from non-telecentricity (FIG. 9c). These distortions are not visible in the print with non-telecentric correction (FIG. 9b), where individual posts retain their as-designed circular geometry (FIG. 9d). Good agreement was obtained between the simulated and print geometry in both cases, as indicated by the simulated geometry outlines in FIGS. 9a-9b. Furthermore, the print scale agrees well with the design geometry; the grid pitch for the non-telecentricity-corrected print is 2.20 mm in the vertical and 2.28 mm in the horizontal directions, compared to a design pitch of 2.21 mm. The discrepancy between the vertical and horizontal scale is likely due to inadvertent stretching of the initially compliant print when mounting on a glass slide before curing. The measured post height in FIG. 9d is ~275 µm, similar to the height of the NRC logo in FIGS. 8a-8b, both of which have the same design height of 650 µm.

The computing device 26 includes a computing system configured to perform the method as described herein. The term computing device refers to data processing hardware and encompass all kinds of apparatus, devices, and machines for processing data, including by way of example, a programmable processor, a computer, or multiple processors or computers. The apparatus can also be, or further include, special purpose logic circuitry, e.g., a central processing unit (CPU), a GPU (a graphics processing unit); a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them.

The computing device 26 may comprise an input/output module 102, to which an input device, such as a keypad, keyboard, touch screen, microphone, speech recognition device, other devices that can accept user information, and/or an output device that conveys information associated with the operation of the computing device 26, including digital data, visual and/or audio information, or a GUI.

The computing device 26 can serve as a client, network component, a server, a database, or other persistency, and/or any other component. In some implementations, one or more components of the computing device 26 may be configured to operate within a cloud-computing-based environment or a distributed computing environment, such as servers 202. The database may include, for example, Oracle™ database, Sybase™ database, or other relational databases or non relational databases, such as Hadoop™ sequence files, HBase™, or Cassandra™. In one example, the database may include computing components (e.g., database management system, database server, etc.) configured to receive and process requests for data stored in memory devices of the database and to provide data from the database.

At a high level, the computing device 26 is an electronic computing device operable to receive, transmit, process, store, or manage data and information. According to some implementations, the computing device 26 may also include, or be communicably coupled with, an application server, e-mail server, web server, caching server, streaming data server, business intelligence (BI) server, and/or other server.

The computing device 26 may receive requests over network 200 from a client application (e.g., executing on another computing device 26) and respond to the received requests by processing said requests in an appropriate software application. In addition, requests may also be sent to the computing device 26 from internal users (e.g., from a command console or by another appropriate access method), external or third parties, other automated applications, as well as any other appropriate entities, individuals, systems, or computers. The application software may be configured to recognize multiple Computer Aided Design (CAD) file types including .STL, .WAV, .3MF, .AMF, .DXF, .IGES, .ISFF, and may grow to support file types such as .CGR, .CKD, .CKT, .EASM, .EDRW, .IAM, JDW, .PAR, .PRT, .SKP, .SLDASM, .SLDDRW, .SLDPRT, .TCT, .WRL, X_B, X_T and .XE depending on third party integration and support.

Computing device 26 includes an interface, as part of the I/O module 102, used according to particular needs, desires, or particular implementations of the computing device 26. The interface is used by computing device 26 for communicating with other systems in a distributed environment, connected to network 200. Generally, the interface comprises logic encoded in software and/or hardware in a suitable combination and operable to communicate with the network 200. More specifically, the interface may comprise software supporting one or more communication protocols associated with communications.

Although single processor 90 is illustrated in FIG. 13, two or more processors may be used according to particular needs, desires, or particular implementations of the computing device 26. Generally, processor 90 executes instructions and manipulates data to perform the operations of the computing device 26. In one example, processor 90 comprises a GPU implemented to speed up Radon transform calculation and ramp filtering of projections for the entire object.

Memory 100 stores data for computing device 26 and/or other components of the system 25. Although illustrated as a single memory 100 in FIG. 13, two or more memories may be used according to particular needs, desires, or particular implementations of the computing device 26. While memory 100 is illustrated as an integral component of the computing device 26, in alternative implementations, memory 100 can be external to the computing device 26 and/or the system 25. For example, memory 100 comprises computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, DVD-ROM disks and Blu-ray disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

In one example, an application in memory 100 comprises an algorithmic instructions providing functionality according to particular needs, desires, or particular implementations of the computing device 26, particularly with respect to functionality required for processing simulations and modelling calculations for distortion correction and correction for non-telecentricity . In addition, although illustrated as integral to the computing device 26, in alternative implementations, the application can be external to the computing device 26.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a GPU, an FPGA, or an ASIC.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network 200. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations, and free-space optical networks. The network may communicate with, for example, Internet Protocol (IP) packets, Frame Relay frames, Asynchronous Transfer Mode (ATM) cells, voice, video, data, and/or other suitable information between network addresses.

The computing system can include clients and servers and/or Internet-of-Things (IoT) devices running publisher/subscriber applications. A client and server are generally remote from each other and typically interact through a communication network. The relationship of client and server arises by virtue of computer programs running on the respective computers and having a client-server relationship to each other.

There may be any number of computers associated with, or external to, the system 25 and communicating over network 200. Further, the terms "client," "user," and other appropriate terminology may be used interchangeably, as appropriate, without departing from the scope of this disclosure. Moreover, this disclosure contemplates that many users may use one computing device 26, or that one user may use multiple computing device 26.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

The benefits and advantages described above may relate to one embodiment or may relate to several embodiments. The embodiments are not limited to those that solve any or all of the stated problems or those that have any or all of the stated benefits and advantages. The operations of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

APPENDIX 1: SIMULATION OF
NON-TELECENTRIC ERROR IN AN INDEX
MATCHED SYSTEM

FIG. 10 shows an expected dose profile for the grid geometry in FIG. 7a, without non-telecentricity correction, but with an index matching bath to eliminate refraction at the vial surface. Even though an index-matching bath with a flat interface is assumed, non-telecentricity still causes significant distortions away from the center of the print. Accordingly, for non-telecentricity correction it is desirable to maintain print resolution and accuracy away from the center of the vial, even when the vial is immersed in an index-matching bath.

APPENDIX 2: EFFECT OF LENSING DISTORTION ON APPLIED DOSE PROFILE

Figures 11A, 11B, 11C:
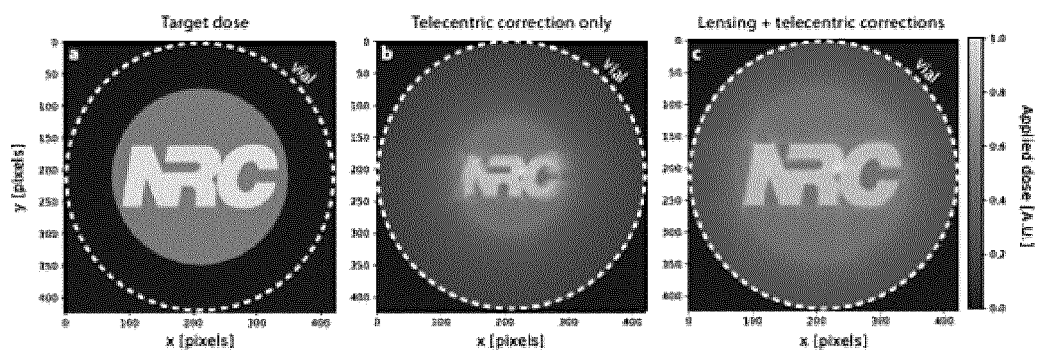
FIG. 11a shows a target dose profile as in FIG. 7d)
FIG. 11b shows a resulting dose profile if only non-telecentricity correction is taken into account (lensing correction not applied)
FIG. 11c shows a dose profile after full correction (lensing and non-telecentricity)
Figures 11D, 11E, 11F:
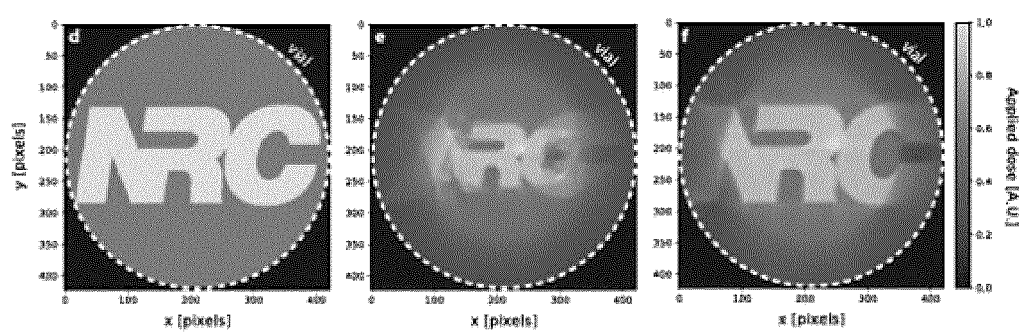
FIG. 11d shows a target dose profile as in FIG. 7d with target a geometry but with a target geometry that occupies the entire diameter of the vial, which is beyond the write area of the vial.
FIG. 11e shows a resulting dose profile if only non-telecentricity correction is taken into account (lensing correction not applied)
FIG. 11f shows a dose profile after full correction (lensing and non-telecentricity)

This appendix shows the effect of ignoring lensing distortion. FIG. 11 shows the applied dose profiles for two different sizes of the "NRC" logo test geometry [FIGS. 11a and 11d]. In each case, lensing distortion causes severe deformation of the applied dose profile [FIGS. 11b and 11e]. Full correction for lensing and non-telecentric ray distortion fully recovers a faithful copy of the target dose inside the write area of the vial [FIGS. 11c and 11f]. Note that the target dose in FIG. 11d extends beyond the writable area of the vial. As a result, the edges of the NRC logo are not fully defined in FIG. 11f, even with full correction.

APPENDIX 3: BEAM DIVERGENCE

Figure 12A:
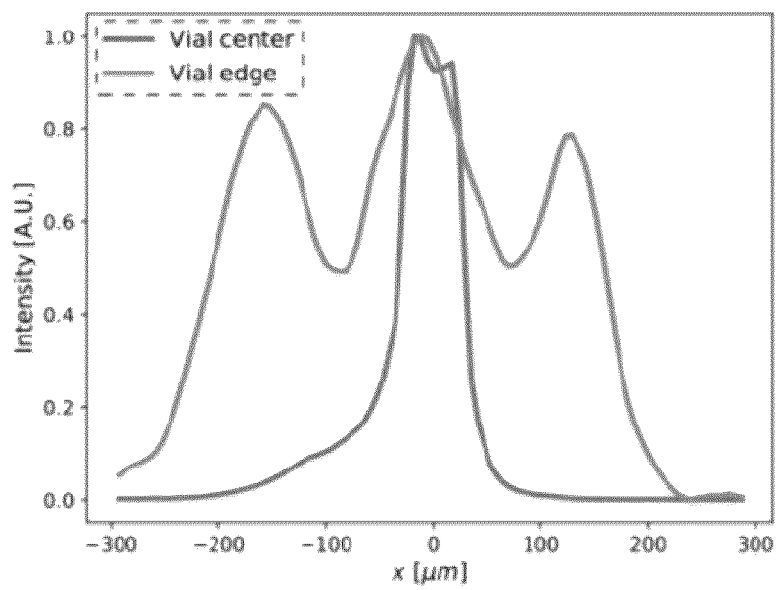
FIG. 12a shows a line intensity plot across the projection of a DMD pixel, measured at the center of the vial and at the edge of the vial.
Figure 12B:
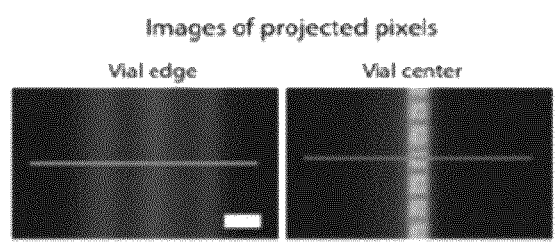
FIG. 12b shows raw images of the vertical projected pixel lines, with horizontal lines indicating the location of the intensity line profiles.
Figure 12C:
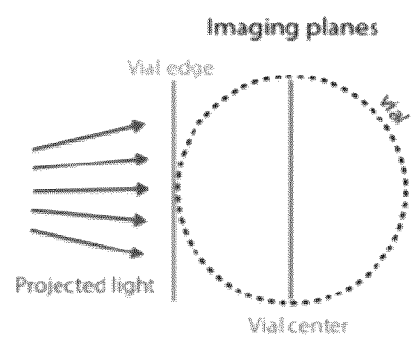
FIG. 12c shows the location of the imaging planes relative to the vial.

It is assumed that angular spread of light from a given projector pixel is too small to compromise the resolution of a print. We measure the beam spread directly by projecting the image of a vertical line of projector pixels directly onto the image sensor of a camera placed at the center of the rotation stage. The camera is then translated along the optical axis using a manual stage, with images recorded every 1.27 mm. In FIG. 12a we plot the horizontal intensity profile of a pixel at the center of vial rotation and at the location of the vial edge (center −12.7 mm). Raw camera images of the line of pixels at each of these planes are shown in FIG. 12b, and the locations of these planes relative to the vial are shown in FIG. 12c. From the line intensity profile, we see that the first diffracted orders of the DMD chip are the main source of beam spread, yielding a beam full width at half maximum (FWHM) of 365 μm at the vial edge, compared to a FWHM of 61 μm at the center of rotation stage. The angular spread $\delta\phi$ can be calculated from the distance between the first diffracted orders $x_{+1}-x_{-1}$, and the distance between imaging planes $\delta z$:

$$\delta\phi = \tan^{-1}\frac{x_{+1}-x_{-1}}{2\delta_z} = \tan^{-1}\frac{141\ \mu m}{12.7\ nm} = 0.64° \quad (10)$$

Note that when the camera is replaced by the vial for printing, the focus plane of the projector is shifted along the optical axis due to refraction at the vial interface, so that the center of rotation of the vial does not correspond exactly to the center of the vial. This occurs regardless of the curvature of the vial, including for index-matched setups with a flat air-glass interface. Nevertheless, the FWHM of the beam from a single projector pixel in the resin will be less than the FWHM measured at the front surface of the vial (365 μm).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments are described above with reference to block diagrams and/or operational illustrations of methods, systems, and computer program products. The operations/acts noted in the blocks may be skipped or occur out of the order as shown in any flow diagram. For example, two or more blocks shown in succession may be executed substantially concurrently or the blocks may sometimes be executed in the reverse order, depending upon the functionality/acts involved. While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments.

REFERENCES

1. J. R. Tumbleston, D. Shirvanyants, N. Ermoshkin, R. Janusziewicz, A. R. Johnson, D. Kelly, K. Chen, R. Pinschmidt, J. P. Rolland, and A. Ermoshkin, "Continuous liquid interface production of 3D objects," Science 347 (6228), 1349-1352 (2015).
2. M. Regehly, Y. Garmshausen, M. Reuter, N. F. Konig, E. Israel, D. P. Kelly, C.-Y. Chou, K. Koch, B. Asfari, and S. Hecht, "Xolography for linear volumetric 3D printing," Nature 588(7839), 620-624 (2020).
3. M. P. de Beer, H. L. van der Laan, M. A. Cole, R. J. Whelan, M. A. Burns, and T. F. Scott, "Rapid, continuous additive manufacturing by volumetric polymerization inhibition patterning," Sci. Adv. 5(1), eaau8723 (2019).
4. M. Shusteff, A. E. M. Browar, B. E. Kelly, J. Henriksson, T. H. Weisgraber, R. M. Panas, N. X. Fang, and C. M. Spadaccini, "One-step volumetric additive manufacturing of complex polymer structures," Sci. Adv. 3(12), eaao5496 (2017).
5. H. Cui, R Hensleigh, D. Yao, D. Maurya, P. Kumar, M. G. Kang, S. Priya, and X. Rayne Zheng, "Three-dimensional printing of piezoelectric materials with designed anisotropy and directional response," Nat. Mater. 18(3), 234-241 (2019).
6. B. Deore, K L. Sampson, T. Lacelle, N. Kredentser, J. Lefebvre, L. S. Young, J. Hyland, R E. Amaya, J. Tanha, P. R L. Malenfant, H. W. de Haan, and C. Paquet, "Direct printing of functional 3D objects using polymerization-induced phase separation," Nat. Commun. 12(1), 55 (2021).
7. D. A. Walker, J. L. Hedrick, and C. A. Mirkin, "Rapid, large-volume, thermally controlled 3D printing using a mobile liquid interface," Science 366(6463), 360-364 (2019).
8. J. J. Schwartz and A. J. Boydston, "Multimaterial actinic spatial control 3D and 4D printing," Nat. Commun. 10(1), 791 (2019).
9. D. G. Moore, L. Barbera, K. Masania, and A. R. Studart, "Three-dimensional printing of multicomponent glasses using phase-separating resins," Nat. Mater. 19(2), 212-217 (2020).
10. R. Hensleigh, H. Cui, Z. Xu, J. Massman, D. Yao, J. Berrigan, and X. Zheng, "Charge-programmed three-dimensional printing for multi-material electronic devices," Nat. Electron. 3,216-224 (2020).
11. B. E. Kelly, I. Bhattacharya, H. Heidari, M. Shusteff, C. M. Spadaccini, and H. K. Taylor, "Volumetric additive manufacturing via tomographic reconstruction," Science 363(6431), 1075-1079 (2019).
12. D. Loterie, P. Delrot, and C. Moser, "High-resolution tomographic volumetric additive manufacturing," Nat. Commun. 11(1), 852 (2020).
13. P. N. Bernal, P. Delrot, D. Loterie, Y. Li, J. Malda, C. Moser, and R. Levato, "Volumetric bioprinting of complex living-tissue constructs within seconds," Adv. Mater. 31(42), 1904209 (2019).
14. Loterie, P. Delrot, and C. Moser, "Volumetric 3D printing of elastomers by tomographic back-projection," Preprint at https://doi.org/10.13140/RG.2.2.20027.46889, (2018).
15. M. Born and E. Wolf, *Principles of Optics: Electromagnetic Theory of Propagation, Interference and Diffraction of Light* (Elsevier, 2013).
16. C. C. Cook, E. J. Fong, J. J. Schwartz, D. H. Porcincula, A. C. Kaczmarek, J. S. Oakdale, B. D. Moran, K. M. Champley, C. M. Rackson, A. Muralidharan, R. R. McLeod, and M. Shusteff, "Highly Tunable Thiol-Ene Photoresins for Volumetric Additive Manufacturing," Adv. Mater. 32(47), 2003376 (2020).
17. A. Oliszewski, D. Fine, and D. Roth, *Digital Media, Projection Design, and Technology for Theatre* (Taylor & Francis, 2018).
18. M. Dawson-Haggerty, "Trimesh," https://github.com/mikedh/trimesh.
19. M. Weigert, "gputools: OpenCL accelerated volume processing," https://github.com/maweigert/gputools.
20. J. Nickolls, I. Buck, M. Garland, and K. Skadron, "Scalable parallel programming with CUDA," Queue 6(2), 40-53 (2008).
21. A. Bagheri and J. Jin, "Photopolymerization in 3D Printing," ACS Appl. Polym. Mater. 1(4), 593-611 (2019).
22. B. K. Horn, "Fan-beam reconstruction methods," Proc. IEEE 67(12), 1616-1623 (1979).
23. F. Noo, M. Defrise, R. Clackdoyle, and H. Kudo, "Image reconstruction from fan-beam projections on less than a short scan," Phys. Med. Biol. 47(14), 3112525 (2002).

The invention claimed is:

1. A method for additive manufacturing of an object having a three-dimensional structure formed from a photo-curable material, the method implemented by a computing device comprising a processor and a computer readable medium having instructions executable by the processor, the method comprising at least the steps of:
 (a) positioning a vial containing the photo-curable material in a path of light rays from a projector;
 (b) obtaining a first set of correction parameters for correcting the non-telecentricity of the projector;
 (c) obtaining a second set of correction parameters for correcting for the refractive index of the photo-curable material;
 (d) calculating projection patterns associated with a 3D geometry of the object based on at least the first set of correction parameters and the second set of correction parameters; and
 (e) projecting, via an optical assembly, the projection patterns onto the vial containing the photo-curable material to form the object.

2. The method of claim 1, comprising a further step of determining an optimally pre-distorted set of the at least one light pattern based on at least the photo-curable material's refractive index, a radius of the vial and a distance of the vial from the projector; correcting at least one distortion of the light rays caused by refraction at the vial interface and/or correcting at least one distortion of the light rays caused by non-telecentricity.

3. The method of claim 2, wherein the correction of the at least one distortion is performed in a horizontal direction (xy-plane) of the vial.

4. The method of claim 2, wherein the correction of the at least one distortion is performed in a vertical direction (xz-plane) of the vial.

5. The method of claim 2, wherein correcting the at least one distortion of the light rays caused by refraction at the vial interface and/or correcting the at least one distortion of the light rays caused by non-telecentricity is performed in an iterative manner; and
 whereby the correction of the at least one distortion of the light rays is performed without altering the calibration of the optical assembly.

6. The method of claim 1, wherein the photo-curable material comprises at least one of a monomer, a photoinitiator, and a curing inhibitor.

7. The method of claim 6, wherein the at least one monomer comprises at least one precursor material.

8. The method of claim 7, wherein the at least one precursor material is selected from the group consisting of an acrylate, methacrylate, olefin, epoxy, vinyl ethers, thiols, acrylamides, silane monomers, and any multifunctional derivatives thereof (crosslinkers) and mixtures thereof.

9. The method of claim 8, wherein the at least one precursor material is selected from the group consisting of bisphenol A glycerolate (1 glycerol/phenol) diacrylate [BPAGDA] and poly(ethylene glycol) diacrylate Mn 250 g/mol [PEGDA250].

10. The method of claim 9, wherein the photocurable resin comprises a Norish Type I or a Type II photoinitiator.

11. The method of claim 10, wherein the photoinitiator is selected from the group consisting of camphorquinone [CQ], ethyl 4-dimethylaminobenzoate [EDAB], diphenyl(2,4,6-trimethylbenzoyl)phosphine oxide [TPO], ethyl(2,4,6-trimethylbenzoyl) phenylphosphinate [TPO-L], lithium phenyl(2,4,6-trimethylbenzoyl)phosphinate [LAP], 2-methyl-4'-(methylthio)-2-morpholiniopropriophenone [Irgacure 907], bis($\eta$5-2,4-cyclopentadien-I-yl)-bis(2,6-difluoro-3-(1H-pyrrol-1-yl)-phenyl) titanium [Irgacure 784], bis(2,4,6-trimethylbenzoyl)-phenylphosphineoxide [Irgacure 819], tris(2,2-bipyridyl) dichlorouthenium (II) hexahydrate, sodium persulfate, and mixtures thereof.

12. The method of claim 1, wherein the projection patterns projected into the photo-curable material create an approximation to a target dose distribution to define the object geometry as the vial is caused to rotate.

13. The method of claim 1, further comprising a step of calibrating an additive manufacturing system by at least: positioning the vial containing the photo-curable material in the path of light rays from the projector and locating the vial position in the projector field by scanning a line through the vial, and with an image capture device, capturing fluorescence emitted by the photo-curable material when the scan line strikes an edge of the vial, and determining edges of a write volume by finding positions of the scan line for which there is a substantial change in captured intensity fluorescence within an image of the vial.

14. A method for correcting for non-telecentricity of a light source used in an additive manufacturing system to form an object having a three-dimensional structure formed from a photo-curable material in a container, wherein the photo-curable material receives a light dose comprising light rays, the method comprising:
(a) calculating a parallel-beam sinogram S on a regular $(x_v, \theta_v)$ grid, where $x_v$ denotes the location of a virtual projector column, and $\theta_v$ is a rotation angle of the virtual projector;
(b) determining the location of distorted rays on the parallel-beam sinogram grid;
(c) determining a relationship between the ray trajectories in the container $(x_v, \theta_v)$, and the spatial $(x_p)$ coordinate on a physical projector and angular ($\theta$) coordinate of the physical projector, where $x_v$ is the spatial coordinate of a ray $R_f$ travelling through the photo-curable material at angle $\theta_v$ with respect to the optical axis on a virtual projector;
(d) performing Fourier-back projection filtering on a standard Radon sinogram S to obtain a filtered sinogram $S_f$;
(e) resampling the filtered sinogram $S_f$ from the standard Radon space $(x_v, \theta_v)$ to the modified physical projector space $(x_p, \theta)$ to obtain a resampled sinogram $S_f$;
(f) projecting a projection geometry for a plurality of the 2D slices of the 3D object onto a container with a photo-curable material, wherein the 3D object is formed by simultaneously projecting the plurality of the 2D slices along a first direction.

15. The method of claim 14, wherein the resampled sinogram $S_f(x_p, \theta)$ is further corrected to account for Fresnel reflections at the air/container interface.

16. The method of claim 15, wherein the resampled sinogram $S_f(x_p, \theta)$ is normalized by the Fresnel transmittance T for each ray 12 emitted from the projector.

17. The method of claim 16, wherein the resampled sinogram $S_f(x_p, \theta)$ is projected into the container to print a target dose distribution.

18. The method of claim 17, wherein a filter is applied on an unfiltered sinogram of step (c) and negative projection values are set to zero resulting in modified projections.

19. The method of claim 18, wherein the filter is at least one of a Ram-Lak Fourier filter, a Shepp-Logan filter, a Cosine filter, a Hamming filter, and a Hann filter.

20. The method of claim 14, wherein an iterative technique is used to calculate undistorted projections.

21. The method of claim 20, wherein the iterative technique is at least one of gradient descent, dose matching, penalty minimization, and object space projection optimization.

22. The method of claim 18, comprising a further step of simulating a 2D approximation to applied light dose within the container by ray tracing the in-plane (x,y) component of the chief rays from each projector pixel in a projector row through the container.

23. The method of claim 22, wherein the 2D approximation to the projected dose is determined by multiplying the ray dose in the container, $R(x, y; x_p, \theta)$, by the intensity of the resampled sinogram $S_f(x_p, \theta)$, and sum over all chief rays.

24. The method of claim 23, wherein the calculation of the chief ray trajectories allow for an approximate 2D simulation of dose accumulation during a print, thereby enabling visualization of artifacts related to incorrect sinogram resampling.

25. A system for forming an object having a three-dimensional structure, the system comprising:
a container for providing a photo-curable material to be polymerized;
a rotatable stage for supporting the container;
a light source for providing light rays having at least one light pattern to be guided into the container via an optical assembly;
a processing unit for determining the light source's degree of non-telecentricity, and determining an optimally pre-distorted set of the at least one light pattern based on at least the photo-curable material's refractive index; correcting at least one distortion of the light rays caused by refraction at the container interface and/or correcting at least one distortion of the light rays caused by non-telecentricity; and
whereby the correction of the at least one distortion of the light rays is performed without altering the calibration of the optical assembly.

26. The system of claim 25, wherein the correction of the distortion is performed in a horizontal direction (xy-plane) of the vial.

27. The system of claim 25, wherein the correction of the distortion is performed in a vertical direction (xz-plane) of the vial.

28. The system of claim 25, wherein determining the optimally pre-distorted set of the at least one light pattern is based on at least a radius of the container and a distance of the container from the projector.

29. The system of claim 25, wherein correcting the at least one distortion of the light rays caused by refraction at the container interface and/or correcting at least one distortion of the light rays caused by non-telecentricity comprises at least:
sampling a parallel-beam sinogram on a regular grid;
determining the location of each of the distorted rays on a parallel-beam sinogram grid;
determining a relationship between the ray trajectories in the vial and angular coordinates of a standard Radon transform;
performing a Fourier back projection filtering on the standard Radon sinogram; and
resampling the sinogram from the standard Radon space to a modified space to compute distortion-corrected projections.

* * * * *